United States Patent
Bansal

(10) Patent No.: US 11,347,231 B2
(45) Date of Patent: May 31, 2022

(54) OBJECT LOCALIZATION FOR AUTONOMOUS DRIVING BY VISUAL TRACKING AND IMAGE REPROJECTION

(71) Applicant: WAYMO LLC, Mountain View, CA (US)

(72) Inventor: Mayank Bansal, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 316 days.

(21) Appl. No.: 16/598,162

(22) Filed: Oct. 10, 2019

(65) Prior Publication Data

US 2021/0041883 A1 Feb. 11, 2021

Related U.S. Application Data

(60) Provisional application No. 62/883,745, filed on Aug. 7, 2019.

(51) Int. Cl.
*G05D 1/02* (2020.01)
*G05D 1/00* (2006.01)
(Continued)

(52) U.S. Cl.
CPC ......... *G05D 1/0231* (2013.01); *G05D 1/0088* (2013.01); *G06T 7/55* (2017.01);
(Continued)

(58) Field of Classification Search
CPC .. G05D 1/0231; G05D 1/0088; G05D 1/0246; G06K 9/00818; G06K 9/00791; G06T 7/55; G06T 7/74; G06T 2207/30252
See application file for complete search history.

(56) References Cited

U.S. PATENT DOCUMENTS

2015/0227801 A1* 8/2015 Mielenz ............... G06T 7/74
382/104
2017/0098129 A1 4/2017 Lo et al.
(Continued)

FOREIGN PATENT DOCUMENTS

WO 2019066770 A1 4/2019

OTHER PUBLICATIONS

Zekavat et al.; Localization for Autonomous Driving; Handbook of Position Location: Theory, Practice, and Advances; IEEE; Jan. 2019; pp. 1051-1087 (Year: 2019).*
(Continued)

*Primary Examiner* — Michael J Zanelli
(74) *Attorney, Agent, or Firm* — Botos Churchill IP Law

(57) ABSTRACT

Aspects of the disclosure relate to verifying the location of an object of a particular type. For instance, a plurality of images of an environment of the vehicle may be received. Associated objects of the particular type may be identified in ones of the plurality of images. A plurality of estimated locations may be determined for the object using a plurality of different localization techniques. For each image of the ones of the plurality of images, determine a reprojection error for each of the plurality of estimated locations. For each of the plurality of estimated locations, an error score is determined based on the reprojection errors. An estimated location may be selected from the plurality of estimated locations based on the determined error score. This selected location may be used to control a vehicle in an autonomous driving mode.

20 Claims, 15 Drawing Sheets

(51) Int. Cl.
*G06T 7/55* (2017.01)
*G06V 20/58* (2022.01)

(52) U.S. Cl.
CPC ... *G06V 20/582* (2022.01); *G05D 2201/0213* (2013.01); *G06T 2207/30252* (2013.01)

(56) References Cited

U.S. PATENT DOCUMENTS

| | | |
|---|---|---|
| 2018/0336697 A1 | 11/2018 | Lu et al. |
| 2019/0066330 A1 | 2/2019 | Luo et al. |
| 2019/0137280 A1 | 5/2019 | Ghadiok et al. |
| 2020/0175718 A1* | 6/2020 | Viswanathan .......... G06T 7/579 |
| 2020/0192398 A1* | 6/2020 | Xu .................... G06K 9/00818 |
| 2020/0217667 A1* | 7/2020 | Kim ...................... G06T 3/0031 |

OTHER PUBLICATIONS

International Search Report and Written Opinion for Application No. PCT/US2020/045384 dated Nov. 23, 2020.

\* cited by examiner

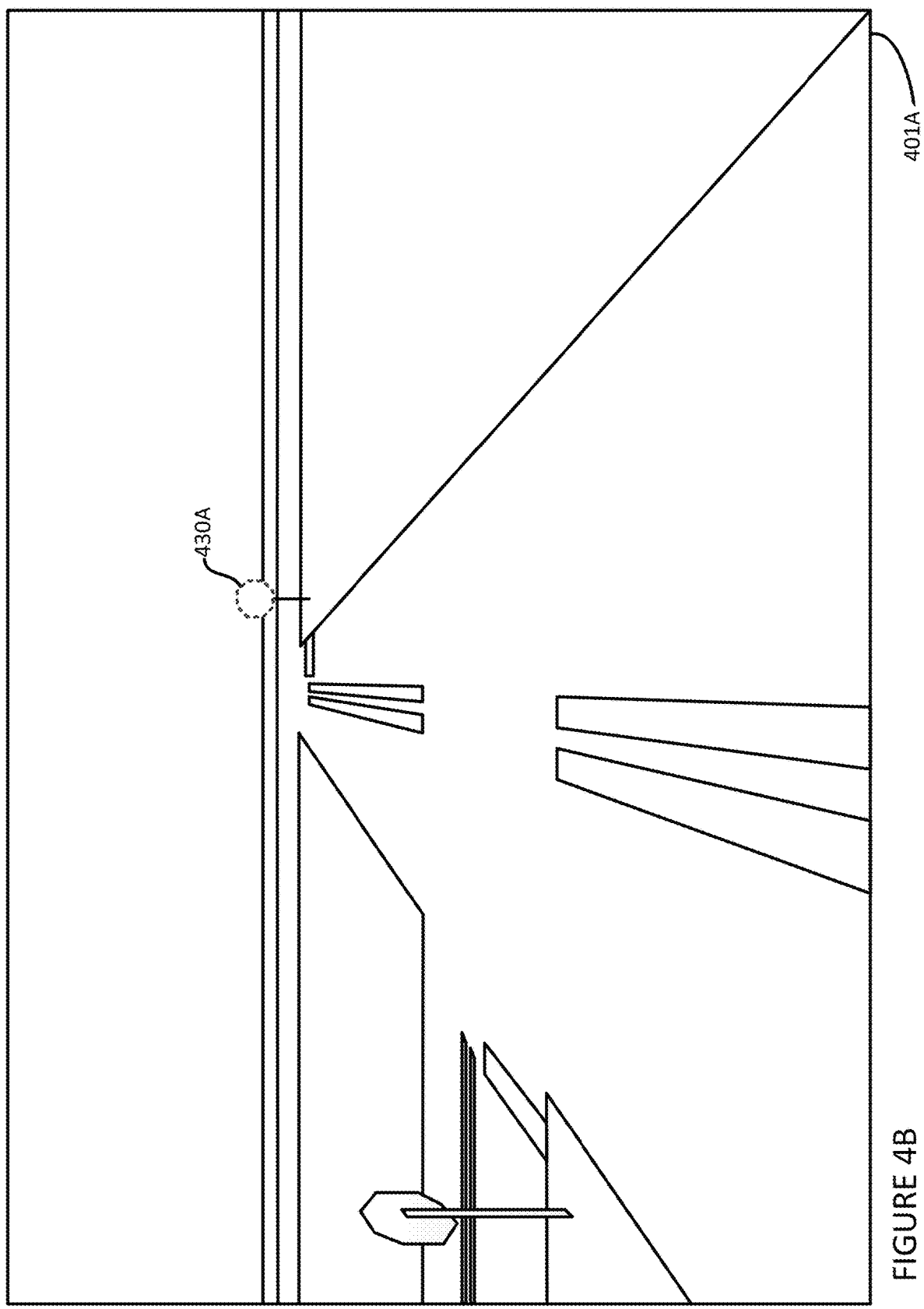

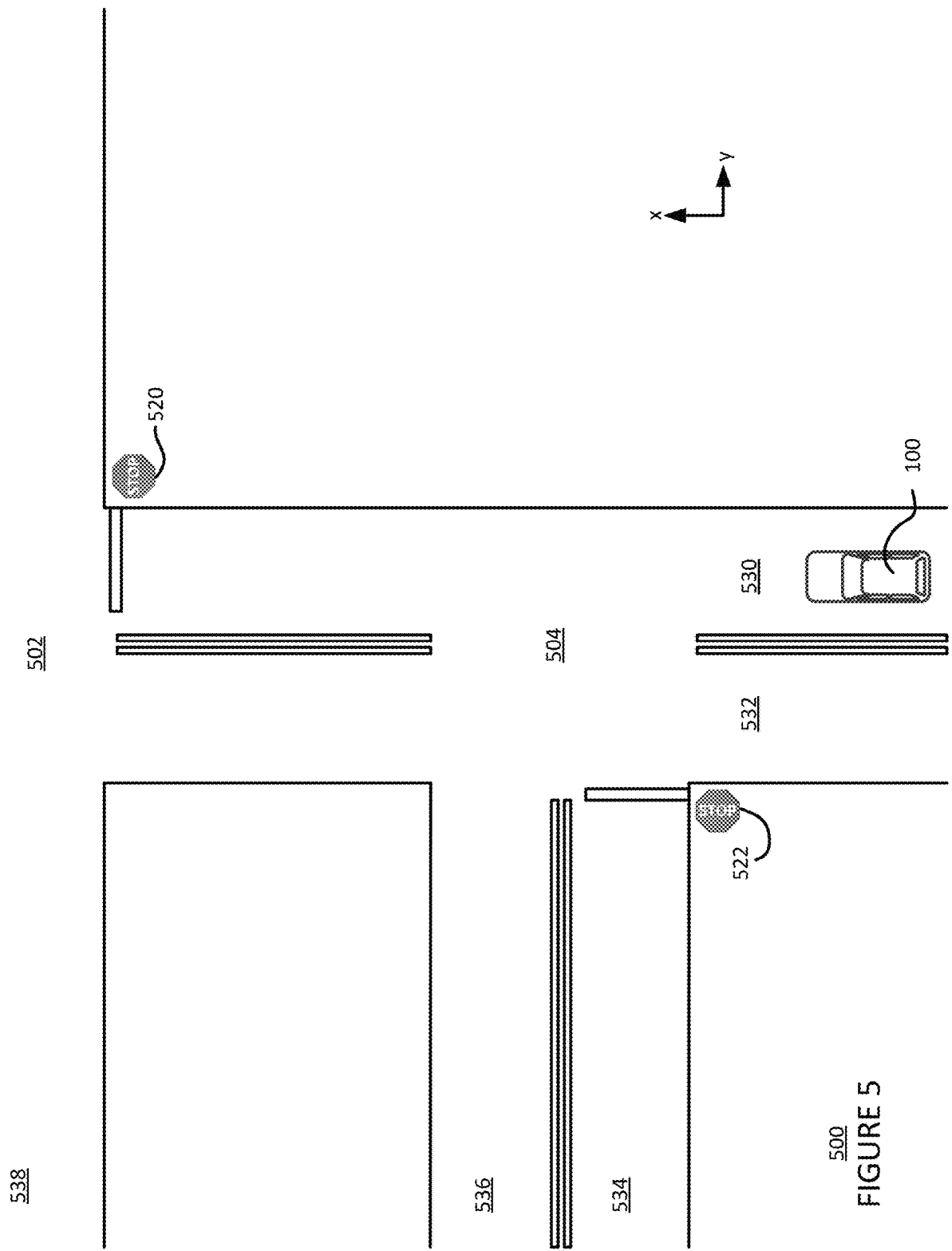

OBJECT LOCALIZATION FOR AUTONOMOUS DRIVING BY VISUAL TRACKING AND IMAGE REPROJECTION

CROSS REFERENCE TO RELATED APPLICATION

This application claims the benefit of the filing date of U.S. Provisional Patent Application No. 62/883,745 filed Aug. 7, 2019, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc.

BRIEF SUMMARY

One aspect of the disclosure provides a method for controlling a vehicle having an autonomous driving mode. The method includes receiving, by one or more processors, a plurality of images of an environment of the vehicle; identifying, by the one or more processors, associated objects of a particular type in ones of the plurality of images; determining, by the one or more processors, a plurality of estimated locations for the object using a plurality of different localization techniques; for each of the plurality of estimated locations, determining, by the one or more processors, an error score; selecting, by the one or more processors, an estimated location from the plurality of estimated locations based on the determined error scores; and controlling, by the one or more processors, the vehicle in the autonomous driving mode based on the selected estimated location.

In one example, the object of the particular type is a stop sign. In another example, the object of the particular type is a yield sign. In another example, the method also includes causing the plurality of images to be captured based on a distance between the vehicle and a location of a stop sign in pre-stored map information used to control the vehicle in the autonomous driving mode. In another example, the method also includes causing the plurality of image to be captured based on a detection of an object of the particular type by a perception system of the vehicle. In another example, the method also includes identifying a patch corresponding to an object of the particular type in a first image of the ones of the plurality of images, wherein the error scores are determined further based on the patch. In another example, identifying the associated objects of the particular type includes identifying a first patch corresponding to an object of the particular type in a first image of the ones of the plurality of images; identifying a second patch corresponding to an object of the particular type in a second image of the ones of the plurality of images; projecting a center of the first patch into the second image; and determining whether the projected center is within an area of the second patch. In another example, the plurality of different localization techniques includes an object size localization based on an expected size for objects of the particular type. In another example, the plurality of different localization techniques includes depth map localization based on sensor data generated by a LIDAR sensor of the vehicle. In another example, the plurality of different localization techniques includes a roadgraph-based localization that includes projecting a ray corresponding to a direction of a center of a patch in an image of the plurality of images into pre-stored map information used to control the vehicle in the autonomous driving mode. In this example, the roadgraph-based localization includes identifying an object of the particular type in the map information that is within a threshold distance of the projected ray. In another example, the method also includes, for each image of the ones of the plurality of images, determining a reprojection error for each of the plurality of estimated locations, and wherein determining the error scores is further based the reprojection errors. In another example, determining one of the errors scores includes: identifying a patch corresponding to an object of the particular type in a first image of the ones of the plurality of images; projecting an estimated location of one of the plurality of estimated locations into the first image; and determining a distance between the projected location and an area of the patch. In this example, determining the distance includes determining a distance between a center of the projected location and a center of the area of the patch. In addition or alternatively, projecting the estimated location of one of the plurality of estimated locations into the first image is based on a pose of the first image. In addition or alternatively, the distance is the one of the reprojection errors. In addition or alternatively, determining one of the error scores includes averaging reprojection errors for a given one of the plurality of location estimations. In another example, selecting the selected estimated location includes selecting an estimated location having a lowest one of the error scores.

Another aspect of the disclosure provides a system for controlling a vehicle having an autonomous driving mode. The system includes one or more processors configured to: receive a plurality of images of an environment of the vehicle; identify associated objects of a particular type in ones of the plurality of images; determine a plurality of estimated locations for the object using a plurality of different localization techniques; for each of the plurality of estimated locations, determine, an error score; select an estimated location from the plurality of estimated locations based on the determined error scores; and control the vehicle in the autonomous driving mode based on the selected estimated location.

In one example, the system also includes the vehicle.

BRIEF DESCRIPTION OF THE DRAWINGS

FIGS. 4B, 4C and 4D are examples images and patches in accordance with aspects of the disclosure.

FIG. 5 is an example representation of a vehicle driving in a geographic area in accordance with aspects of the disclosure.

DETAILED DESCRIPTION

Overview

Figure 1:
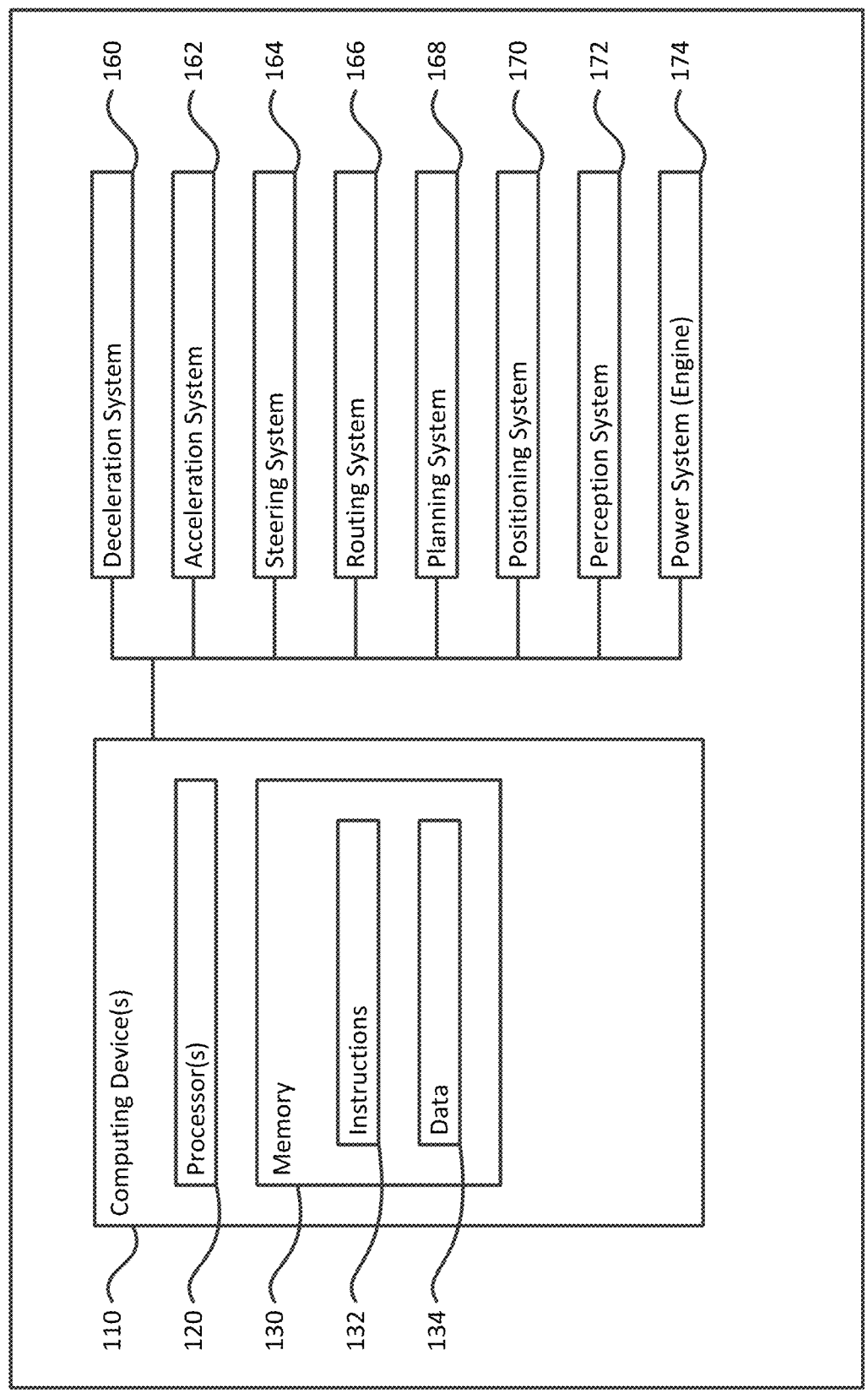
FIG. 1 is a functional diagram of an example vehicle in accordance with aspects of the disclosure.

The technology relates to a method of verifying or confirming the location of an object for autonomous vehicles or vehicle configured to operate in an autonomous driving mode. For example, different localization techniques may provide different locations for the same object. As a result, the same object may appear to be in different locations at the same time. In situations in which the object is a stop sign, an autonomous vehicle operating in reliance on these locations may react to the sign at each of the different locations. For instance, the vehicle may stop at various points along a roadway though there are no stop signs at those locations. Therefore, selecting the "best" location for an object may enable a vehicle to navigate roadways more accurately or smoothly.

One or more cameras of a perception system of the vehicle may capture a plurality of images which may include an object. In some instances, the plurality of images may be a sequence of images captured by the same camera or different cameras over time. If the same camera is used, each of these images may be captured when the camera is at the same (if the vehicle is not moving) or different poses (if the vehicle is moving). In addition, the plurality of images may be captured in response to the perception system detecting an object of a particular type and the vehicle is approaching the object, such as a stop sign or yield sign, or when the vehicle is predetermined distance from an expected location of an object of a particular type as identified in the map information and the vehicle approaching the object.

The vehicle's computing devices may be configured to identify the object in a first image of the plurality of images. This may include using various object recognition techniques to identify a "patch" or a plurality of pixels in the first image corresponding to the object. The vehicle's computing devices may be configured to engage object recognition techniques continuously or only in certain situations such as when the vehicle is a set distance from a location of an object of a particular type such as a stop sign or a yield sign as determined from information stored in map information.

When the object identified in the first image is of a particular type, the object may be localized using a plurality of different localization techniques. A first example localization technique may involve object size localization. For instance, based on the object's type, the vehicle's computing devices may use an expected size of the object to estimate a distance between the vehicle and the object. Combining this estimated distance with the pose of the image capture location when the image was captured may be used to estimate a three-dimensional (3D) location of the object. In some instances, if the expected size of the object is incorrect, if the object in the image is partially occluded, or the object simply does not conform to the expected size (i.e. a broken sign or a manufacturing error), the estimated location for the object determined using this technique may be incorrect.

A second example localization technique may involve depth map localization. For instance, the vehicle's computing devices may use sensor data generated by a LIDAR sensor of the perception system to generate a depth map. By projecting the depth map into the image using the pose of the camera, a 3D location of the object may be estimated. In some instances, if the LIDAR sensor's view of the object is partially occluded, such as by another road user, debris, falling leaves, a tree branch, a sign or other object, the estimated location for the object determined using this technique may be incorrect.

A third example localization technique may involve a roadgraph-based localization. For instance, the vehicle's computing devices may determine an orientation of the center or some other location on the patch relative to the location of the camera (and/or the vehicle) and then use this orientation to project a ray in the map information. This ray may represent coordinates on which the object may be found given a location of the object in the image relative to the pose of the camera when the image was captured. One or more objects, such as mapped stop signs, may be identified that lie along or within a predetermined distance of the computed ray. Another estimated location for the object may then be determined using the location of any identified object in the map information. In some instances, if the object has been damaged or moved (e.g. a bent sign pole for a stop sign or a yield sign), is temporary (such as a temporary stop sign) or new and does not appear in the map information, or if there a plurality of objects of the same type along the ray, the estimated location for the object determined using this technique may be incorrect.

The vehicle's computing devices may determine whether any object in the image is the same object as an object in other images of the plurality of images and may associate these objects with one another. For example, the computing devices may determine whether the same stop sign appears in each of the plurality of images. The associations may be generated by projecting pixel locations of one object in one object into the pixel locations of another object in another image. The projected pixel locations of an may be adjusted according to a difference between the poses of the camera when the two images were captured. When the projected pixel locations of one object in one image is within a threshold pixel distance of pixel locations of another object in another image, an association is generated to indicate that the patches in each image represent the same object (hereafter, the associated object). These associations may be used to verify the estimated locations and select one of the estimated locations for the location of the object at the time that the first image was captured.

For each image that includes object associated with another object in another image, the vehicle's computing devices may determine a reprojection error for each of the estimated locations of the associated object. To do so, each estimated location for the associated object may be projected into each image in which the associated object was identified. A reprojection error may be (or may be derived from) the distance between a projected estimated location and the patch corresponding to the associated for that image. This process may be repeated for any other of the estimated locations and for a predetermined number of (e.g. 3 images or more or less) or all of the images in which the associated object has been identified.

The vehicle's computing devices may then determine an error score for each localization technique or rather, for each estimated location, determined using the different localization techniques. As one example, the reprojection errors scores determined from the projection of the same estimated location projected into the different images in which the associated object appears may be averaged together. In this regard, if there are three localization techniques or three estimated locations for the object, there would be three error scores.

The vehicle's computing devices may then select the localization technique or estimated location for the object at the time the first image was captured based on the determined error score. For example, the estimated location having the lowest error score may be determined to be the location of the object at the time the first image was captured.

The computing devices 110 may be configured to control the vehicle in the autonomous driving mode in order to respond to the object according to the selected estimated location. For example, when the object is a stop sign, vehicle's computing devices may then operate the one or more self-driving systems to navigate the autonomous vehicle to stop according to the selected estimated location and ignore all other estimated locations for the stop sign. Similarly, when the object is a yield sign, vehicle's computing devices may then operate the one or more self-driving systems to navigate the autonomous vehicle to yield according to the selected estimated location of the yield sign and ignore all other estimated locations for the yield sign.

The features described above may provide for a system that more accurately identifies locations of certain types of objects along a roadway for an autonomous vehicle. In particular, stop signs locations may be identified. The autonomous vehicle, as a result, may be less likely to respond to incorrect locations of the object, for instance, improperly stopping at a location with no stop sign or exhibiting yielding behaviors at a location with no yield sign. Such situations may be confusing and potentially dangerous for other road users as well as the autonomous vehicle. Further, because such behaviors can be avoided, occupants of the autonomous vehicle may experience a smoother ride and reach their destination more efficiently. In addition, resources of the autonomous vehicle may be utilized more efficiently since they need not be used to respond to objects which are incorrectly localized.

Example Systems

FIG. 1 provides an example block diagram of a vehicle 100 including various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

The map information may be pre-stored and may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 2:
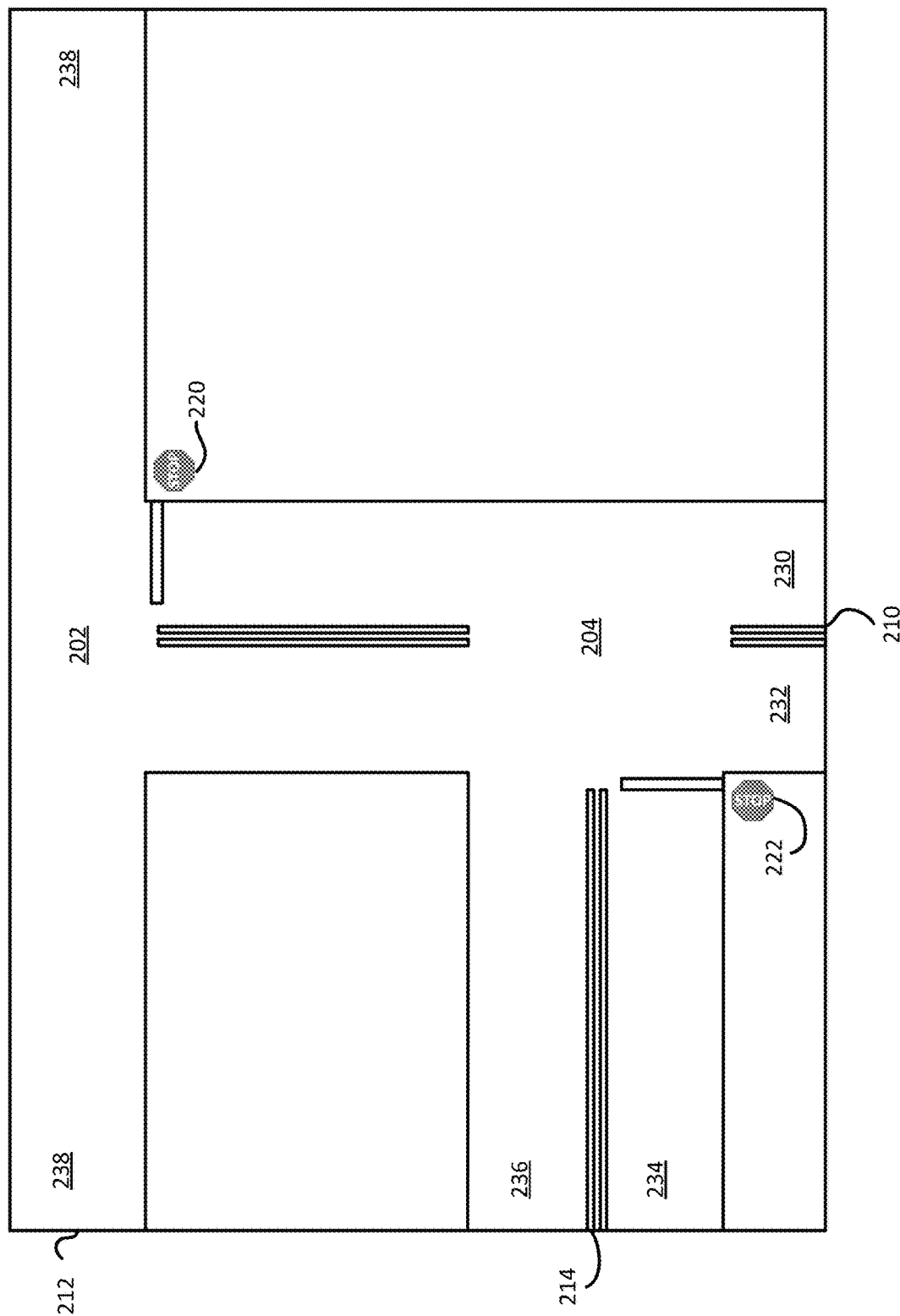
FIG. 2 is an example map information in accordance with aspects of the disclosure.

As shown in FIG. 2, an example of the map information, here map information 200, includes details related to intersections 202 and 204. Roadways 210 and 212 meet at intersection 202, and roadways 212 and, 214 meet at intersection 204. Roadway 210 has a lane 230 going in a first direction, and a lane 232 going in a second direction opposite the first direction. Roadway 212 has a lane 234 going in a third direction perpendicular to the first and second directions. Roadway 214 has a lane 236 going in the third direction, and a lane 238 going in a fourth direction opposite the third direction and passing through intersection 202. The map information also includes location information for stop signs 220, 222. In particular, a location for stop sign 220 may be indicated to be at intersection 202 on a side of lane A of roadway 210, and a location for stop sign 222 may be indicated to be at intersection 204 on a side of lane 236 of roadway 214.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
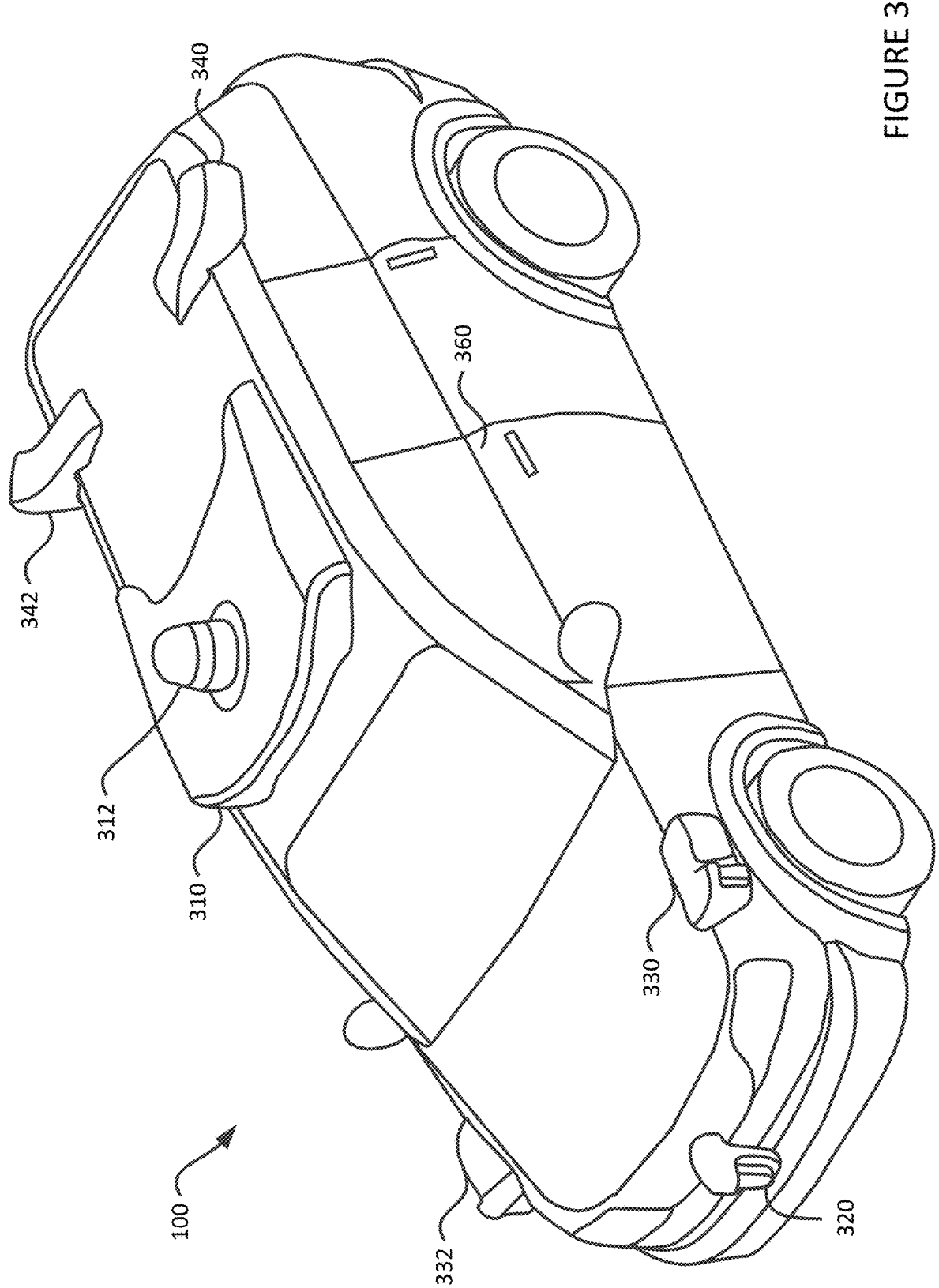
FIG. 3 is an example representative view of a vehicle in accordance with aspects of the disclosure.

FIG. 3 is an example external view of vehicle 100 including aspects of the perception system 172. For instance, roof-top housing 310 and dome housing 312 may include a LIDAR sensor or system as well as various cameras and radar units. In addition, housing 320 located at the front end of vehicle 100 and housings 330, 332 on the driver's and passenger's sides of the vehicle may each store a LIDAR sensor or system. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals of the vehicle). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
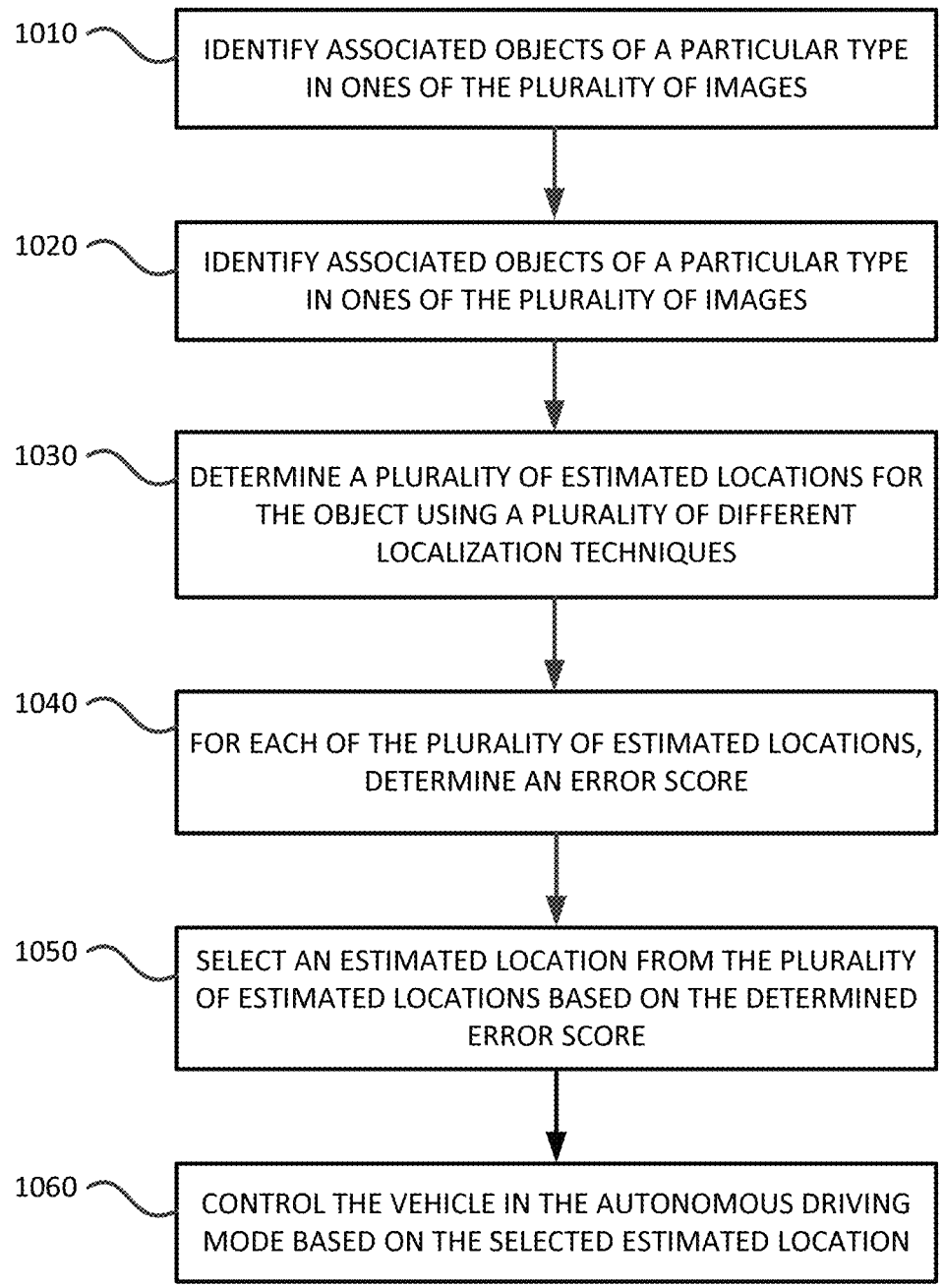
FIG. 10 is an example flow diagram in accordance with aspects of the disclosure.

FIG. 10 is an example flow diagram 1000 for an example method of controlling a vehicle having an autonomous driving which may be performed by one or more processors, such as the one or more processors 120 of the computing devices 110, one or more processors of the perception system 172, or a combination of both. For instance, at block 1010, a plurality of images of an environment of a vehicle having an autonomous driving mode may be received. As an example, one or more cameras of the perception system 172 of the vehicle may capture a plurality of images which may include an object. In some instances, the plurality of images may be a sequence of images captured by the same camera or different cameras over time. If the same camera is used, each of these images may be captured when the camera is at the same (if the vehicle is not moving) or different poses (if the vehicle is moving).

The plurality of images may be captured for various reasons. As the vehicle is driven through its environment, the vehicle's perception system may detect and identify objects, including objects of a particular type, such as a stop sign or yield sign. If the vehicle is approaching the object of the particular type, the computing devices 110 may then determine an estimated location for the object by capturing a plurality of images. Alternatively, when the vehicle is predetermined distance, which may correspond to a maximum range of a sensor of the vehicle such as a LIDAR sensor used for depth-map localization, from an expected location of an object of a particular type as identified in the map information and the vehicle approaching the object, the plurality of images may be captured.

As shown in FIG. 5, the vehicle 100 may be driving in a geographic area 500 including the geographic area shown in stored map portion 200. In this regard, the shape and location of each of intersections 502, 504 generally correspond to the shape and location of each of intersections 202, 204, respectively, the shape and location of stop sign 520, 522 generally correspond to the shape and locations of stop signs 220, 222, and the shape and location of each of lanes 530, 532, 534, 536, 538 generally correspond to the shape and location of each of lanes 230, 232, 234, 236, 238, respectively.

In this example, the perception system 172 may identify the stop sign 520 as a stop sign and provide this information to the computing devices 110. In response, the computing devices may cause the perception system 172 to capture the plurality of images. Alternatively, based on the identification of a stop sign, the perception system may automatically capture the plurality of images. As another alternative, the computing devices 110 may cause the perception system 172 to capture the plurality of images once the computing devices have determined that the vehicle is the predetermined distance from the stop sign 520 in the map information either in a linear distance or along a route which the vehicle is currently following.

Figure 4A:
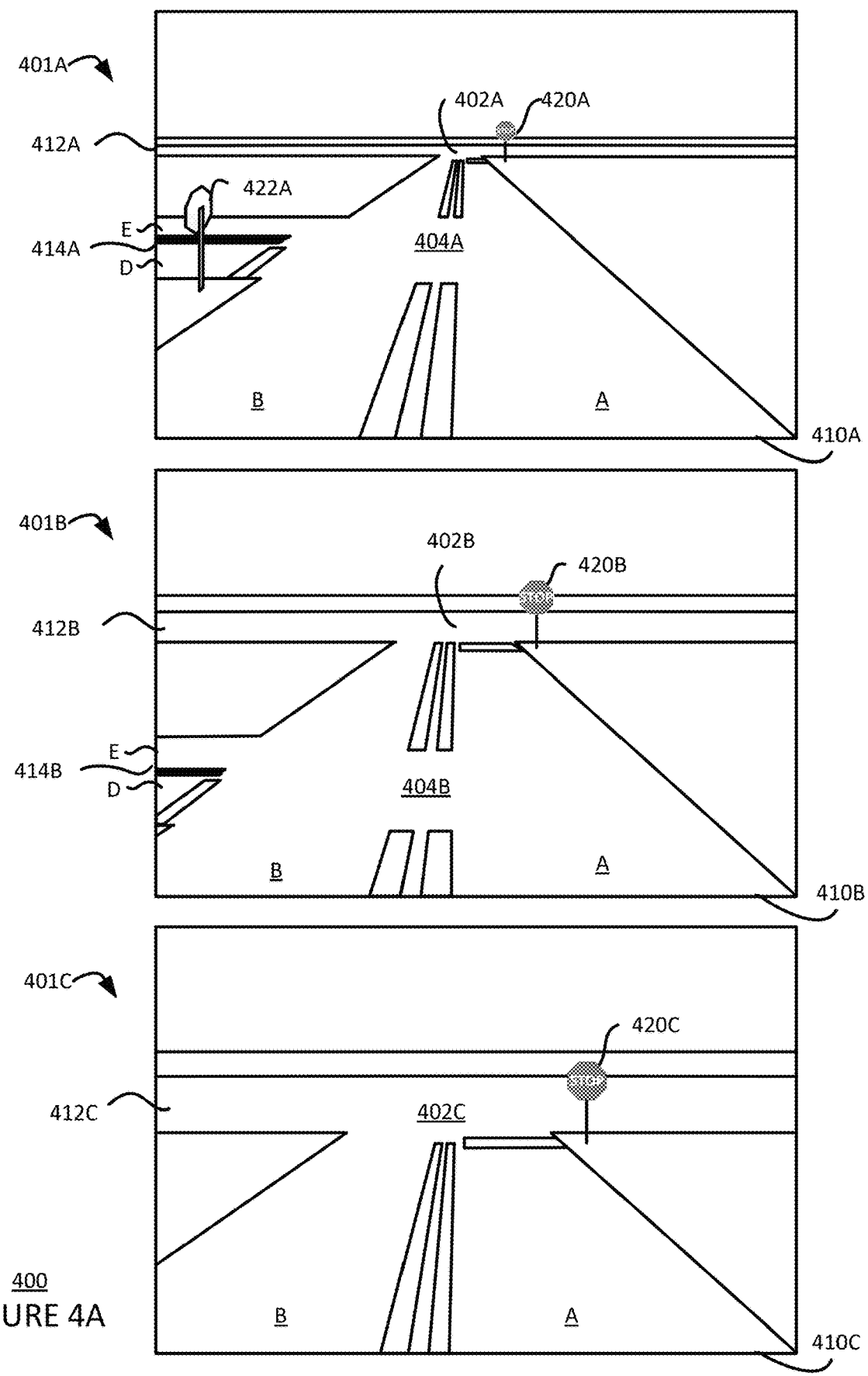
FIG. 4A is a plurality of images in accordance with aspects of the disclosure.

For instance, a plurality of images may be captured when a stop sign is detected by the perception system 172 or when the vehicle 100 is a predetermined distance from a location of a stop sign in the map information 200. In some instances, the plurality of images may be a sequence of images captured by the same camera or a different camera over time. If the same camera is used, each of these images may be captured when the camera is at the same (if the vehicle is not moving) or different poses (if the vehicle is moving). FIG. 4A, provides an example plurality of images 400 including a first image 401A may be captured at a first point in time with a first pose of the camera of the perception system 172, a second image 401B may be captured at a second point in time after the first point in time with a second pose of the camera, and a third image 401C may be captured at a third point in time after the second point in time with a third pose. The first, second, and third images may be captured successively at 10 Hz or other frequency. In this regard, FIG. 5 may represent a time at which the image 401A was captured. As the vehicle moves closer to the stop sign 520, the second image 401B may be captured, and thereafter the third image 401C may be captured.

In some implementations, the plurality of images may include the first image 401A and the second image 401B may be captured and processed as described herein. Additional images beyond the first image 401A and the second image 401B, such as the third image 401C, may be included in the plurality of images and therefor be captured and processed as described herein. The number of additional images captured and processed may depend on latency requirements of the system or a timeframe in which an estimated location of a stop sign is needed. For example, when an estimated location is needed within 0.5 seconds of detecting a given stop sign and processing requires 0.1 seconds, four images may be captured 10 Hz or a greater frequency and processed.

The pose for each image of the plurality of images may be determined based on the location of the vehicle and the relative location of the camera that captured the image with respect to the vehicle. For instance, using positioning system 170 and the map information, the vehicle's computing devices 110 may determine that the vehicle 100 is located in lane 530 of roadway 210 heading in a direction towards intersection 504 when the first image 401A is captured from the camera of the perception system 172. This in combination with the relative location and orientation of the camera that captured the image with respect to the vehicle 100 at the time the image was captured may be used to determine the first pose for the first image 401A. A similar process may be repeated for each image of the plurality of images.

In this example, first image 401A may capture intersections 402A, 404A, roadways 410A, 412A, 414A, and stop signs 420A, 422A. Roadway 410A may include a lane A (corresponding to lane 230), which is the lane of travel of the vehicle 100, going in a first direction and a lane B (corresponding to lane 232) going in a second direction opposite the first direction; roadway 412A may include one or more lanes that are going in a third direction perpendicular to the first and second directions; and roadway 414A may include a lane D (corresponding to lane 236) going in the third direction and a lane E going in a fourth direction opposite the third direction. Second image 401B, taken after the vehicle 100 has traveled a distance down the lane A, may capture intersections 402B, 404B, roadways 410B, 412B, 414B, and stop sign 420B. Third image 401C, taken after the vehicle 100 has traveled a further distance down the lane A, may capture intersection 402C, roadways 410C, 412C, and stop sign 420C. In this example, stop signs 420A, 420B, and 420C may be the same stop sign, though based on the detection of stop signs in each of these three images alone, this associated would not be "known" to the computing devices 110.

Returning to FIG. 10, at block 1020, associated objects of a particular type in ones of the plurality of images are identified. For instance, the computing devices 110 may be configured to identify the object of the particular type in a first image of the plurality of images. This first image could be a first image in time, a second image in time, or some other image of the plurality. Identifying the object may include using various object recognition techniques to identify a "patch" or a plurality of pixels in the first image corresponding to the object. Such techniques may include convolutional deep networks that detect specific object regions in camera images. These networks may be trained by supervised learning using labeled examples of regions of training images containing the specific objects such as stop signs or yield signs.

Figure 4C:
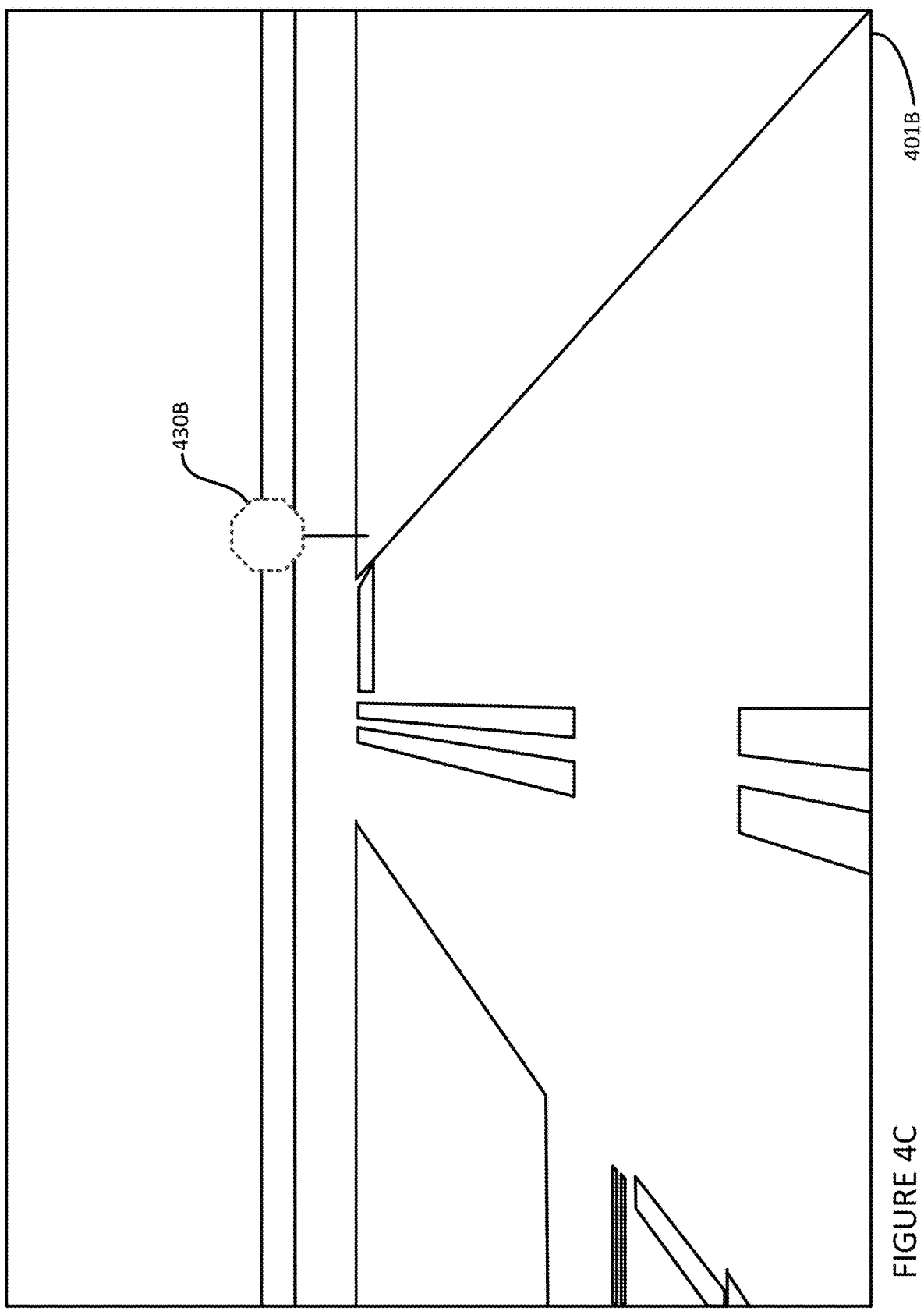
Figure 4D:
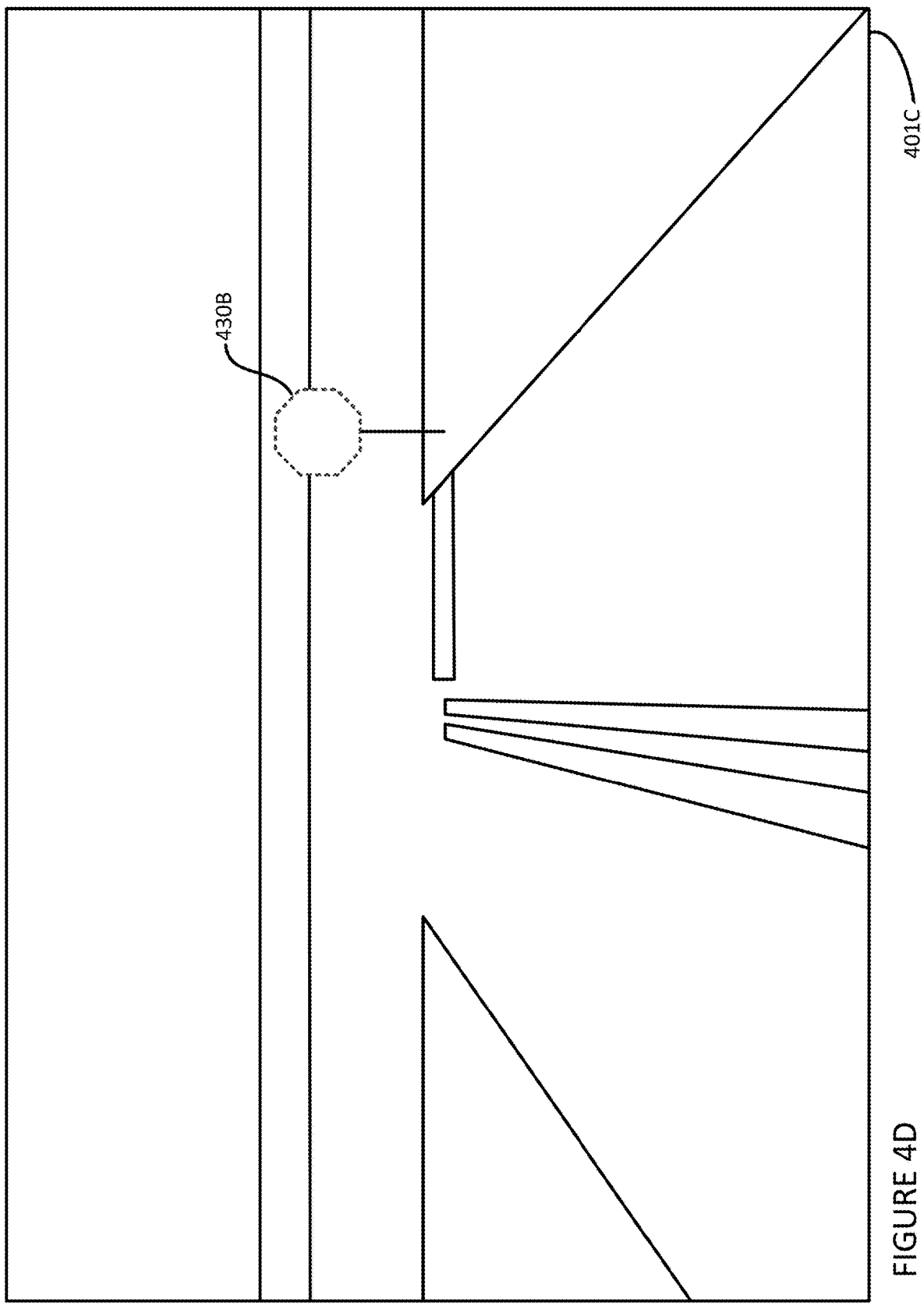

For instance, FIG. 4B depicts an example patch (represented by the area outlined in dashed-line) for the stop sign 420A in image 401A. Similar patches 430B, 430C may also be determined for the stop signs 420B and 420C in images 401B1 and 401C, as shown in FIGS. 4C and 4D, respectively. The computing devices 110 may be configured to engage object recognition techniques continuously or only in certain situations such as when the vehicle is a set distance from a location of an object of a particular type such as stop sign or a yield sign as determined from information stored in map information. This process may be used to identify other objects of the particular type in other images of the plurality.

The computing devices 110 may determine whether any object in the image is the same object as an object in other images of the plurality of images and may associate these objects with one another. For example, the computing devices may determine whether the same stop sign appears in each of the plurality of images. The associations may be generated by projecting a center of a patch of one object in one image into the image of another object in another image. The projected pixel locations may be adjusted according to a difference between the poses of the camera when the two images were captured. If the projection overlaps with or is within an area with a patch corresponding to the another object in the another image, an association is generated to indicate that the patches in each image represent the same object (hereafter, the associated object). Otherwise, the patches would not correspond to the same object. The associations may be used to verify the estimated locations and select one of the estimated locations for the location of the object at the time that the first image was captured. The associations may be generated before, at the same time, or after generating the estimated locations.

Figure 7:
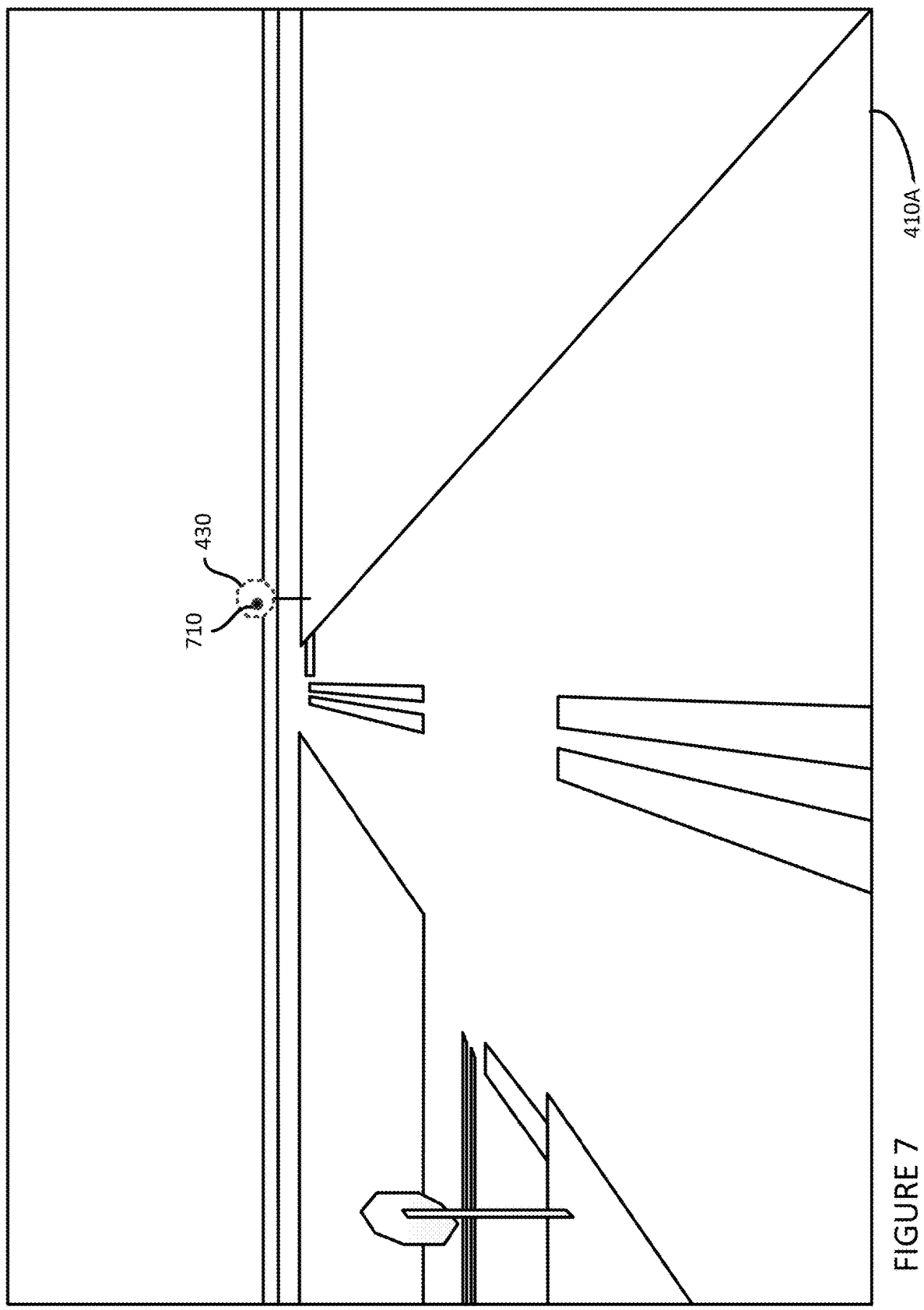
FIG. 7 is an example diagram of a projection of a center of a patch into an image in accordance with aspects of the disclosure.

As shown in FIG. 7, the center 710 of patch 430B for stop sign 420B may be projected into the image 401A. In this example, the center 710 of the patch 430B is within the area of the patch 430A. As such, the computing devices 110 may determine that the patch of stop sign 420A and the patch 430B are the same object. In addition, the center of patch 430A may be projected into the second image 401B. If the projected location of the center of patch 430A is within the area of patch 430B, the computing devices 110 may determine that the patch corresponding to stop sign 420B and the patch corresponding to stop sign 420A are the same object. These projections may be performed for each pair of images of the plurality of images having identified patches corresponding to the particular type of object.

Returning to FIG. 10, at block 1030, a plurality of estimated locations is determined for the object using a plurality of different localization techniques. A first example localization technique may involve object size localization. For instance, based on the object's type, the vehicle's computing devices may use an expected size or expected dimensions of the object to estimate a distance between the vehicle and the object. This may involve comparing dimensions, for instance height and or width in pixels, of the patch to expected dimensions of the object at different distances and identifying a distance associated with the expected dimensions that are closest to the dimensions of the patch. Alternatively, the dimensions of the patch may be input into an equation that provides an estimated distance based on expected dimensions of the object. This may be useful because the dimensions of certain objects, such as stop and yield signs may be fairly consistent or otherwise regulated or dictated by law. Combining this estimated distance with the pose of the image capture location when the image was captured may be used to estimate a three-dimensional (3D) location of the object. For instance, comparing images 401A, 401B, and 401C, the stop signs 420A, 420B, 420C appear larger as the distance between the vehicle (or the camera that captured the images) and the stop sign decreases. Turning to the example of FIG. 4A, the vehicle's computing devices 110 may determine a first estimated location for the stop sign 420A using a first localization technique, such as object size localization as described above.

A second example localization technique may involve depth map localization. For instance, the vehicle's computing devices may use sensor data generated by a LIDAR sensor of the perception system may provide a depth map. By projecting the image using the pose of the camera into the depth map, a 3D location of the object may be estimated. Returning to the example of FIG. 4A, the computing devices 110 may determine a second estimated location for the stop sign 420A using a second localization technique, such as depth map localization. At the same time as the image 401A was captured or very close in time, a LIDAR sensor of the perception system 172 may generate sensor data identifying the locations (x, y, z) and intensities of surfaces of objects in the vehicle's environment. This sensor data may be used to generate a depth map identifying surfaces in the vehicle's environment in 3D with respect to one another, and the image 401A or simply the patch 430A may be projected into the depth map using the pose of the camera that captured the image 401A at the time that the image was captured. The location of a surface of the depth map on which the patch 430A is projected may a second estimated location for the stop sign 420A.

A third example localization technique may involve a roadgraph-based localization. For instance, the vehicle's computing devices may determine an orientation of the center or some other location on the patch relative to the location of the camera (and/or the vehicle) and then use this orientation to project a ray in the map information. This ray may represent coordinates on which the object may be found given a location of the object in the image relative to the pose of the camera when the image was captured. One or more objects, such as mapped stop signs, may be identified that lie along or within a predetermined distance of the computed ray. Another estimated location for the object may then be determined using the location of any identified object in the map information.

Returning to the example of FIG. 4A, the computing devices 110 may determine a third estimated location for the stop sign 420A using a third localization technique, such as roadgraph-based localization. The roadgraph-based localization may localize the stop sign 420A to obtain another estimated location for the object. The roadgraph-based localization may include computing a three-dimensional ray from a location of the camera that captured the first image 401A at the time the image was captured through a center of the patch 430A in the first image 401A. The location of the camera may be derived from the first pose, the position of the vehicle, and the location of the camera relative to the vehicle at the time that the image 401A was captured.

Figure 6:
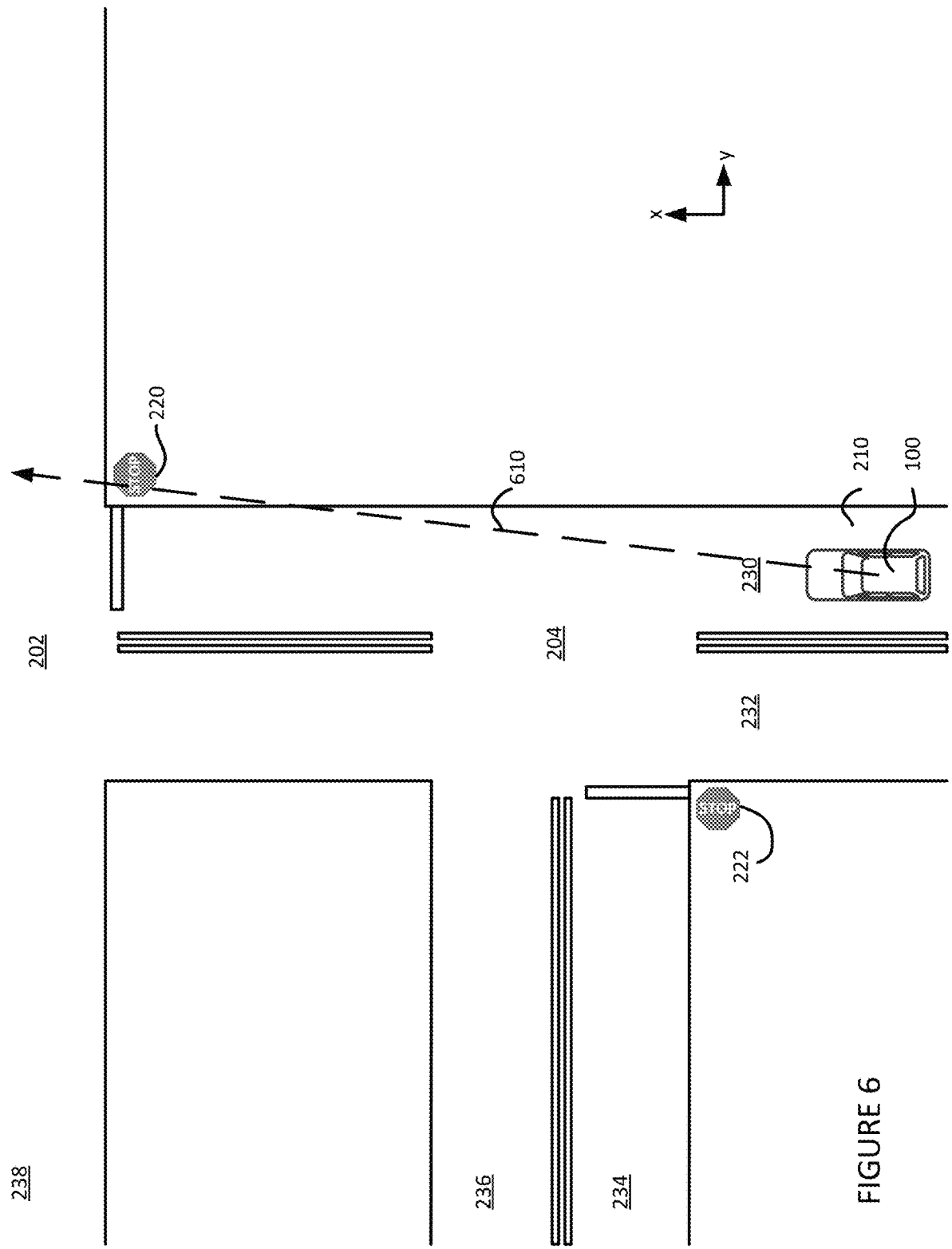
FIG. 6 is an example representation of map information and a projection of a ray in accordance with aspects of the disclosure.

As shown in FIG. 6, a ray 610 oriented in a direction corresponding to the center of the patch 430 may be projected into the map information from the determined location of the vehicle 100 based on the first pose of the camera. The angle of the projected ray relative to the first pose of the camera may be determined by determining a location of the stop sign 420A relative to a center of the first image 401A and mapping the difference between the location of the stop sign 420A and the center of the first image 401A to an angular distance in the geographic area 500.

A mapped stop sign may be identified as having x-, y-coordinates along or within a threshold distance from the coordinates of the ray. In some cases, being within a threshold distance for the z-coordinates may be required as well. The threshold distance may be determined based on a density of stop signs in order to disambiguate between stop signs in the geographic area. For instance, for a higher density of stop signs may require a lower threshold distance than for a lower density of stop signs. As shown in FIG. 6 and using a threshold distance of 5 feet in the x-dimension and 5 feet in the y-dimension, the ray 610 may pass within 5 feet in the x-dimension and the y-dimension of the first stop sign 220 according to the location information for the first stop sign 220 in the map information for map portion 200. No other stop signs, such as second stop sign 222, lie within 5 feet of the ray 610. Therefore, the first stop sign 220 may be identified.

The coordinates of the first mapped stop sign stored in the map information may be determined to be the estimated location for a roadgraph-based localization. For example, the location information for the first stop sign 220 may be used as a third estimated location for the stop sign 420A as captured in the first image 401A.

In some instances, an additional number of mapped stop signs may also be identified using the roadgraph-based localization described above as having an x-, y-coordinates within the threshold distance from the computed ray and have a detectable orientation. The coordinates of each of the additional number of mapped stop signs may be added to the set of estimated locations for the first stop sign. Alternatively, the coordinates of the mapped stop sign that is closest to the computed ray out of the first mapped stop sign and the additional number of mapped stop signs may be selected as the estimated location for the first stop sign to be added to the set of estimated locations.

In other instance, the first mapped stop sign that is identified to lie along or within the predetermined threshold distance of the ray may also be identified as having an orientation that allows the camera to detect the first mapped stop sign as a stop sign. For instance, returning to FIG. 6, based on the map information for the map portion 200, the orientation of the first stop sign 220 may be determined to be facing the lane 230 in which the vehicle 100 is travelling such that the word STOP on the first stop sign 220 would be detectable by the camera. When the first mapped stop sign does not have the orientation that allows the camera to detect the first mapped stop sign as a stop sign, the first mapped stop sign may be filtered from the localization process. For example, according to the map information, the orientation of the second stop sign 222 is not facing the lane 230 such that the word STOP would be captured by the camera of the vehicle 100. Therefore, should the second stop sign 222 be within the threshold distance from the coordinates of the ray, the second stop sign 222 would be filtered from the roadgraph localization process and/or ignored by the vehicle.

Figure 8:
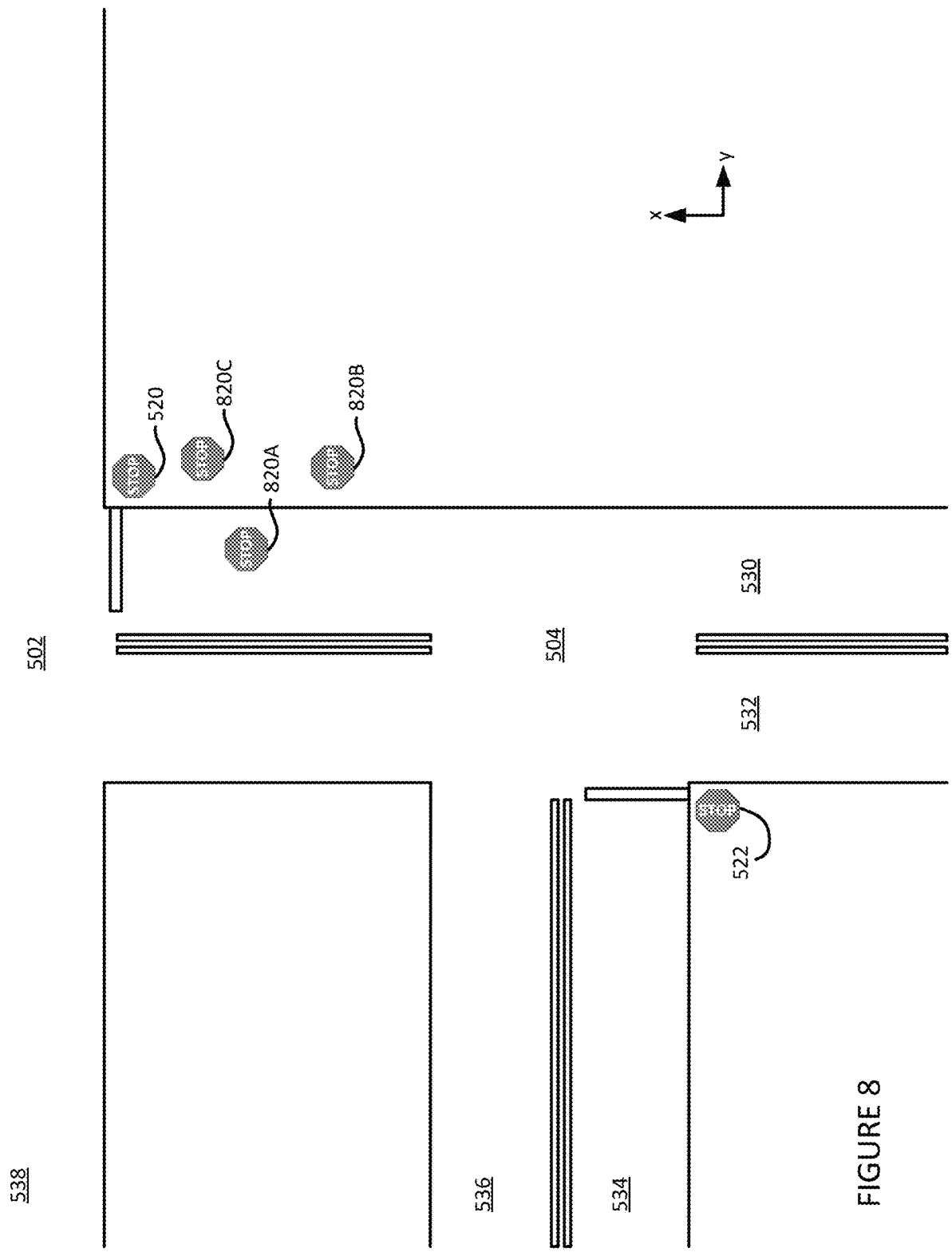
FIG. 8 is an example representation of a geographic area and estimated locations of an object in accordance with aspects of the disclosure

FIG. 8 provides an example representation of a plurality of estimated locations 820A, 820B, 820C for the stop sign 520 which may be determined via a first localization technique, a second localization technique, and a third localization technique such as the object size localization, depth map localization, and roadgraph-based localization techniques described above. In this example, each localization technique may have some associated error. For instance, for the object size localization, if the expected size or dimensions of the object is incorrect, if the object in the image is partially occluded, or the object simply does not conform to the expected size or dimensions (i.e. a broken sign, a manufacturing error, or other inconsistency), the estimated location for the object determined using this technique may be incorrect. As another instance, for the depth map localization, if the LIDAR sensor's view of the object is partially occluded, such as by another road user, debris, falling leaves, a tree branch, a sign or other object, the estimated location for the object determined using this technique may be incorrect. As another instance, the roadgraph-based localization, if the object has been damaged or moved (e.g. a bent sign pole for a stop sign or a yield sign), is temporary (such as a temporary stop sign) or new and does not appear in the map information, or if there a plurality of objects of the same type along the ray, the estimated location for the object determined using this technique may be incorrect.

Figure 9A:
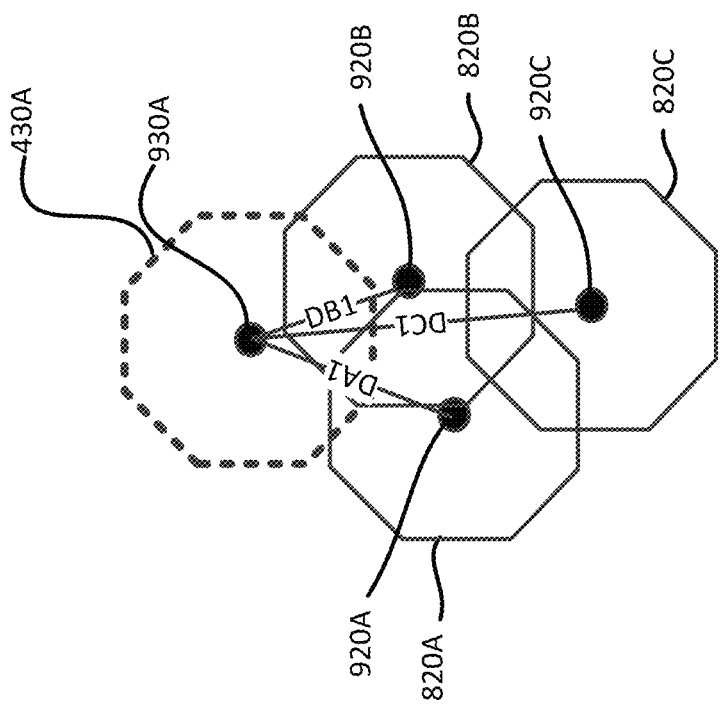
FIGS. 9A, 9B, 9C are example representation of images including image patches, projected estimated locations, and reprojection errors in accordance with aspects of the disclosure.
Figure 9B:
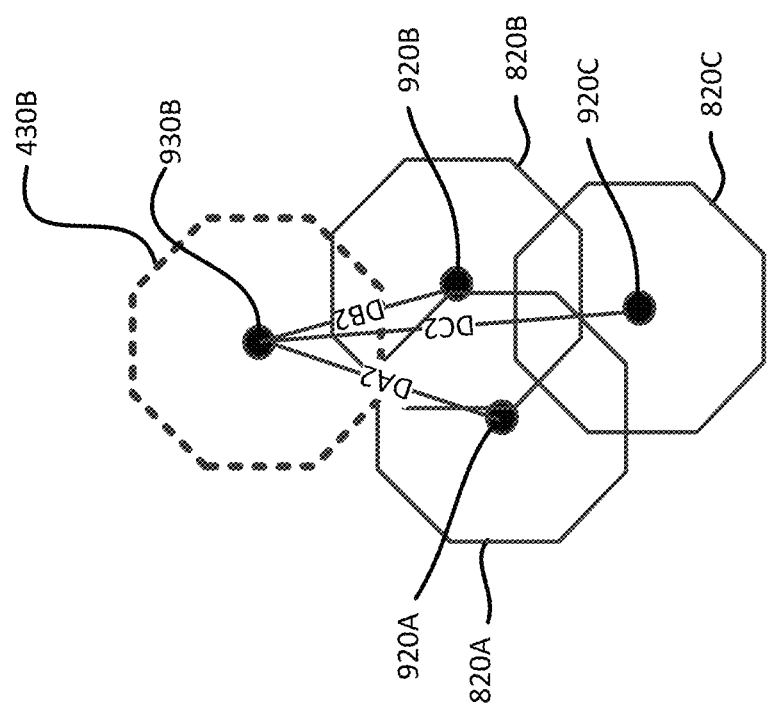
Figure 9C:
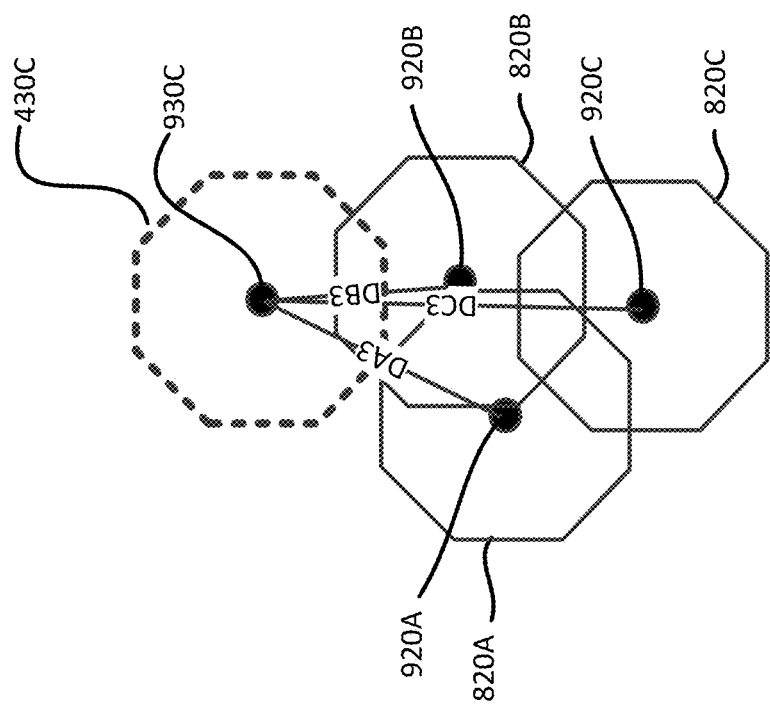

Returning to FIG. 10, at block 1040, for each of the plurality of estimated locations, an error score may be determined. This error score may be based on a reprojection error. For instance, for each image including object associated with another object in another image, the computing devices 110 may determine a reprojection error for each of the estimated locations of the associated object. To do so, each estimated location for the associated object may be projected into each image in which the associated object was identified. A reprojection error may be (or may be derived from) the distance between a projected estimated location and the patch corresponding to the associated for that image. This process may be repeated for any other of the estimated locations and for a predetermined number of (e.g. 3 images or more or less) or all of the images in which the associated object has been FIGS. 9A, 9B, and 9C represent detail views of the images 401A, 401B, 401C, respectively, and depicting the areas of patches 430A, 430B, 430C, respectively, without the details of the images themselves for ease of understanding. As shown in FIG. 9A, the first estimated location 820A, second estimated location 820B, and the third estimated location 820C may be projected in to the first image 401A. Points 920A, 920B, 920C represent the center of the estimated locations 820A, 820B, 820C, respectively, and points 930A, 930B, 930C represent the center of the patches 430A, 430B, 430C, respectively.

The distances DA1, DB1, and DC1 between the estimated locations and the patch 430A, for instance between the center of the patch 430A and the center of each of the estimated locations, may be identified as first reprojection errors for each of the estimated locations. Turning to FIG. 9B, the first estimated location 820A, second estimated location 820B, and the third estimated location 820C may be projected in to the first image 401B. The distances DA2, DB2, and DC2 between the estimated locations and the patch 430B corresponding to the pixels of image 401B identified for the stop sign 420B, for instance between a center of the patch and the center of each of the estimated location, may be identified as second reprojection errors for each of the estimated locations. Turning to FIG. 9C, the first estimated location 820A, second estimated location 820B, and the third estimated location 820C may be projected in to the first image 401B. The distances DA3, DB3, and DC3 between the estimated locations and the patch 430C, for instance between the center of the patch 430C and the center of each of the estimated locations, may be identified as reprojection errors for each of the estimated locations.

The computing devices 110 may then determine an error score for each localization technique or rather, for each estimated location of the plurality of estimated locations, determined using the different localization techniques. As one example, the reprojection errors scores determined from the projection of the same estimated location projected into the different images in which the associated object appears may be averaged together. For instance, the distance DA1, DA2, and DA3 may be averaged together to determine an error score for the estimated location 820A. In addition, the distances DB1, DB2, and DB3 may be averaged together to determine an error score for the estimated location 820B, and the distance DC1, DC2, and DC3 may be averaged together to determine an error score for the estimated location 820A.

The number of error scores may depend upon the number of localization techniques of the plurality of localization techniques. For instance, if there are two localization techniques or two estimated locations for the object, there would be two error scores. Similarly, if there are three localization techniques or three estimated locations for the object, there would be three error scores. As such, if there are additional localization techniques or estimated locations for the object, there would be additional error scores.

Returning to FIG. 10, at block 1050, an estimated location is selected from the plurality of estimated locations based on the determined error score. For instance, the computing devices 110 may select a localization technique or estimated location from the plurality of estimated locations for the object at the time the first image was captured based on the determined error score. For example, the estimated location having the lowest error score may be determined to be the location of the object at the time the first image was captured. In other words, the estimated location having the shortest average projected distance to the patches of the plurality of images may be selected. For instance, the estimated location 820B may be selected as the average of the distances DB1, DB2, and DB3 may be less than the average of the distances DA1, DA2, and DA3 as well as the average the distance DC1, DC2, and DC3.

Returning to FIG. 10, at block 1060, the vehicle is controlled in the autonomous driving mode based on the selected estimated location. For instance, the computing devices 110 may be configured to control the vehicle in the autonomous driving mode in order to respond to the object according to the selected estimated location. This may involve inputting the selected location into the planning system 168 or behavior models. For example, when the object is a stop sign, vehicle's computing devices may then operate the one or more self-driving systems to navigate the autonomous vehicle to stop according to the selected estimated location and ignore all other estimated locations for the stop sign. Similarly when the object is a yield sign, vehicle's computing devices may then operate the one or more self-driving systems to navigate the autonomous vehicle to yield according to the selected estimated location of the yield sign and ignore all other estimated locations for the yield sign.

In some instances, when the object is a stop sign and the selected estimated location of the stop sign does not correspond to (e.g. is not the same as or very close to) the coordinates of a mapped stop sign, the stop sign may be identified as a temporary or a possible new stop sign. The same may also be true for a yield sign or other types of objects. In addition, this information may be stored in the map information and/or sent to a remote computing device for further analysis.

In alternative examples, the vehicle's computing devices 110 may further be configured to identify a trajectory of a moving sign using the plurality of images. The moving sign may be a temporary sign being moved into an active position, such as a handheld stop sign or a stop sign on a bus. A prediction regarding a location of the temporary sign or a timing of when the temporary sign will be in the active position may be determined by the computing devices 110. The vehicle 100 may then be operated by the computing devices in order to navigate according to the predictions.

The features described above may provide for a system that more accurately identifies locations of certain types of objects along a roadway for an autonomous vehicle. In particular, stop signs locations may be identified. The autonomous vehicle, as a result, may be less likely to respond to incorrect locations of the object, for instance, improperly stopping at a location with no stop sign or exhibiting yielding behaviors at a location with no yield sign. Such situations may be confusing and potentially dangerous for other road users as well as the autonomous vehicle. Further, because such behaviors can be avoided, occupants of the autonomous vehicle may experience a smoother ride and reach their destination more efficiently. In addition, resources of the autonomous vehicle may be utilized more efficiently since they need not be used to respond to objects which are incorrectly localized.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling a vehicle having an autonomous driving mode, the method comprising:
    receiving, by one or more processors, a plurality of images of an environment of the vehicle;
    identifying, by the one or more processors, corresponding objects of a particular type in ones of the plurality of images;
    determining, by the one or more processors, a plurality of estimated locations for the corresponding objects using a plurality of different localization techniques;
    for each of the plurality of estimated locations, determining, by the one or more processors, an error score;
    selecting, by the one or more processors, an estimated location from the plurality of estimated locations based on the determined error scores; and
    controlling, by the one or more processors, the vehicle in the autonomous driving mode based on the selected estimated location.

2. The method of claim 1, wherein the corresponding objects of the particular type are stop signs.

3. The method of claim 1, wherein the corresponding objects of the particular type are yield signs.

4. The method of claim 1, further comprising, causing the plurality of images to be captured based on a distance between the vehicle and a location of a stop sign in pre-stored map information used to control the vehicle in the autonomous driving mode.

5. The method of claim 1, further comprising, causing the plurality of image to be captured based on a detection of an object of the particular type by a perception system of the vehicle.

6. The method of claim 1, further comprising, identifying a patch corresponding to an object of the particular type in a first image of the ones of the plurality of images, wherein the error scores are determined further based on the patch.

7. The method of claim 1, wherein identifying the corresponding objects of the particular type includes:
    identifying a first patch corresponding to an object of the particular type in a first image of the ones of the plurality of images;
    identifying a second patch corresponding to an object of the particular type in a second image of the ones of the plurality of images;
    projecting a center of the first patch into the second image; and
    determining whether the projected center is within an area of the second patch.

8. The method of claim 1, wherein the plurality of different localization techniques includes an object size localization based on an expected size for objects of the particular type.

9. The method of claim 1, wherein the plurality of different localization techniques includes depth map localization based on sensor data generated by a LIDAR sensor of the vehicle.

10. The method of claim 1, wherein the plurality of different localization techniques includes a roadgraph-based localization that includes projecting a ray corresponding to a direction of a center of a patch in an image of the plurality of images into pre-stored map information used to control the vehicle in the autonomous driving mode.

11. The method of claim 10, wherein the roadgraph-based localization includes identifying an object of the particular type in the map information that is within a threshold distance of the projected ray.

12. The method of claim 1, further comprising, for each image of the ones of the plurality of images, determining a reprojection error for each of the plurality of estimated locations, and wherein determining the error scores is further based on the reprojection errors.

13. The method of claim 1, wherein determining one of the errors scores includes:
    identifying a patch corresponding to an object of the particular type in a first image of the ones of the plurality of images;
    projecting an estimated location of one of the plurality of estimated locations into the first image; and
    determining a distance between the projected location and an area of the patch.

14. The method of claim 13, wherein determining the distance includes determining a distance between a center of the projected location and a center of the area of the patch.

15. The method of claim 13, wherein projecting the estimated location of one of the plurality of estimated locations into the first image is based on a pose of the first image.

16. The method of claim 13, further comprising determining a reprojection error for each of the plurality of estimated locations, and wherein the distance is one of the reprojection errors.

17. The method of claim 13, further comprising determining a reprojection error for each of the plurality of estimated locations, wherein determining one of the error scores includes averaging the reprojection errors for the plurality of location estimations.

18. The method of claim 1, wherein selecting the estimated location includes selecting an estimated location having a lowest one of the error scores.

19. A system for controlling a vehicle having an autonomous driving mode, the system comprising one or more processors configured to:
- receive a plurality of images of an environment of the vehicle;
- identify corresponding objects of a particular type in ones of the plurality of images;
- determine a plurality of estimated locations for the corresponding objects using a plurality of different localization techniques;
- for each of the plurality of estimated locations, determine, an error score;
- select an estimated location from the plurality of estimated locations based on the error scores; and
- control the vehicle in the autonomous driving mode based on the selected estimated location.

20. The system of claim 19, further comprising the vehicle.

* * * * *

UNITED STATES PATENT AND TRADEMARK OFFICE
CERTIFICATE OF CORRECTION

| | |
|---|---|
| PATENT NO. | : 11,347,231 B2 |
| APPLICATION NO. | : 16/598162 |
| DATED | : May 31, 2022 |
| INVENTOR(S) | : Mayank Bansal |

It is certified that error appears in the above-identified patent and that said Letters Patent is hereby corrected as shown below:

In the Claims

Claim 5, Column 17, Line 63:
Now reads: "image"; should read -- images --

Claim 6, Column 18, Line 2:
Now reads: "the error"; should read -- the determined error --

Claim 17, Column 18, Line 64:
Now reads: "location estimations"; should read -- estimated locations --

Claim 18, Column 18, Line 67:
Now reads: "the error"; should read -- the determined error --

Signed and Sealed this
Nineteenth Day of July, 2022

Katherine Kelly Vidal
*Director of the United States Patent and Trademark Office*